US011641510B2

(12) United States Patent
Pandit et al.

(10) Patent No.: US 11,641,510 B2
(45) Date of Patent: May 2, 2023

(54) FACILITATION OF VIDEO SESSION OPTIMIZATION FOR 5G OR OTHER NEXT GENERATION NETWORK

(71) Applicant: AT&T Intellectual Property I, L.P., Atlanta, GA (US)

(72) Inventors: Kartik Pandit, Aberdeen, NJ (US); Joseph Golan, Ocean, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 122 days.

(21) Appl. No.: 17/190,693

(22) Filed: Mar. 3, 2021

(65) Prior Publication Data

US 2022/0286754 A1    Sep. 8, 2022

(51) Int. Cl.
| | |
|---|---|
| *H04N 21/647* | (2011.01) |
| *H04N 21/61* | (2011.01) |
| *H04N 21/658* | (2011.01) |
| *H04N 21/2662* | (2011.01) |
| *H04W 8/24* | (2009.01) |
| *H04N 21/462* | (2011.01) |
| *H04W 72/08* | (2009.01) |

(52) U.S. Cl.
CPC ... *H04N 21/64738* (2013.01); *H04N 21/2662* (2013.01); *H04N 21/4621* (2013.01); *H04N 21/6131* (2013.01); *H04N 21/6582* (2013.01); *H04W 8/24* (2013.01); *H04W 72/085* (2013.01)

(58) Field of Classification Search
CPC ......... H04N 21/64738; H04N 21/2662; H04N 21/4621; H04N 21/6131; H04N 21/6582; H04W 8/24; H04W 72/085
See application file for complete search history.

(56) References Cited

U.S. PATENT DOCUMENTS

2014/0366070 A1\* 12/2014 Lee .................... H04N 21/4621
725/62
2022/0217560 A1\* 7/2022 Kumar .................... H04W 8/24

\* cited by examiner

*Primary Examiner* — Alazar Tilahun
(74) *Attorney, Agent, or Firm* — Amin, Turocy & Watson, LLP

(57) ABSTRACT

A radio access network intelligent controller (RIC) can comprise a physical resource block (PRB) scheduler that can facilitate the streaming of videos. When a user equipment (UE) requests a video, the PRB scheduler can take into account channel quality data associated with the connection between the UE and a distributed unit of a base station. The PRB scheduler can also receive video stream rate information from a video server. Based on the video stream rate information and the channel quality data, the PRB scheduler can make a decision regarding what types of videos to facilitate streaming to the UE.

20 Claims, 10 Drawing Sheets

FACILITATION OF VIDEO SESSION OPTIMIZATION FOR 5G OR OTHER NEXT GENERATION NETWORK

TECHNICAL FIELD

This disclosure relates generally to facilitating video session optimization. For example, this disclosure relates to facilitating video session optimization utilizing a radio access network intelligent controller for a 5G, or other next generation network, air interface.

BACKGROUND

5th generation (5G) wireless systems represent a next major phase of mobile telecommunications standards beyond the current telecommunications standards of 4th generation (4G). 5G can support higher capacity than current 4G, allowing a higher number of mobile broadband users per area unit, and allowing consumption of higher data quantities. This would enable a large portion of the population to stream high-definition media many hours per day with their mobile devices, when out of reach of wireless fidelity hotspots. 5G networks also provide improved support of machine-to-machine communication, also known as the Internet of things, enabling lower cost, lower battery consumption, and lower latency than 4G equipment.

The above-described background relating to is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
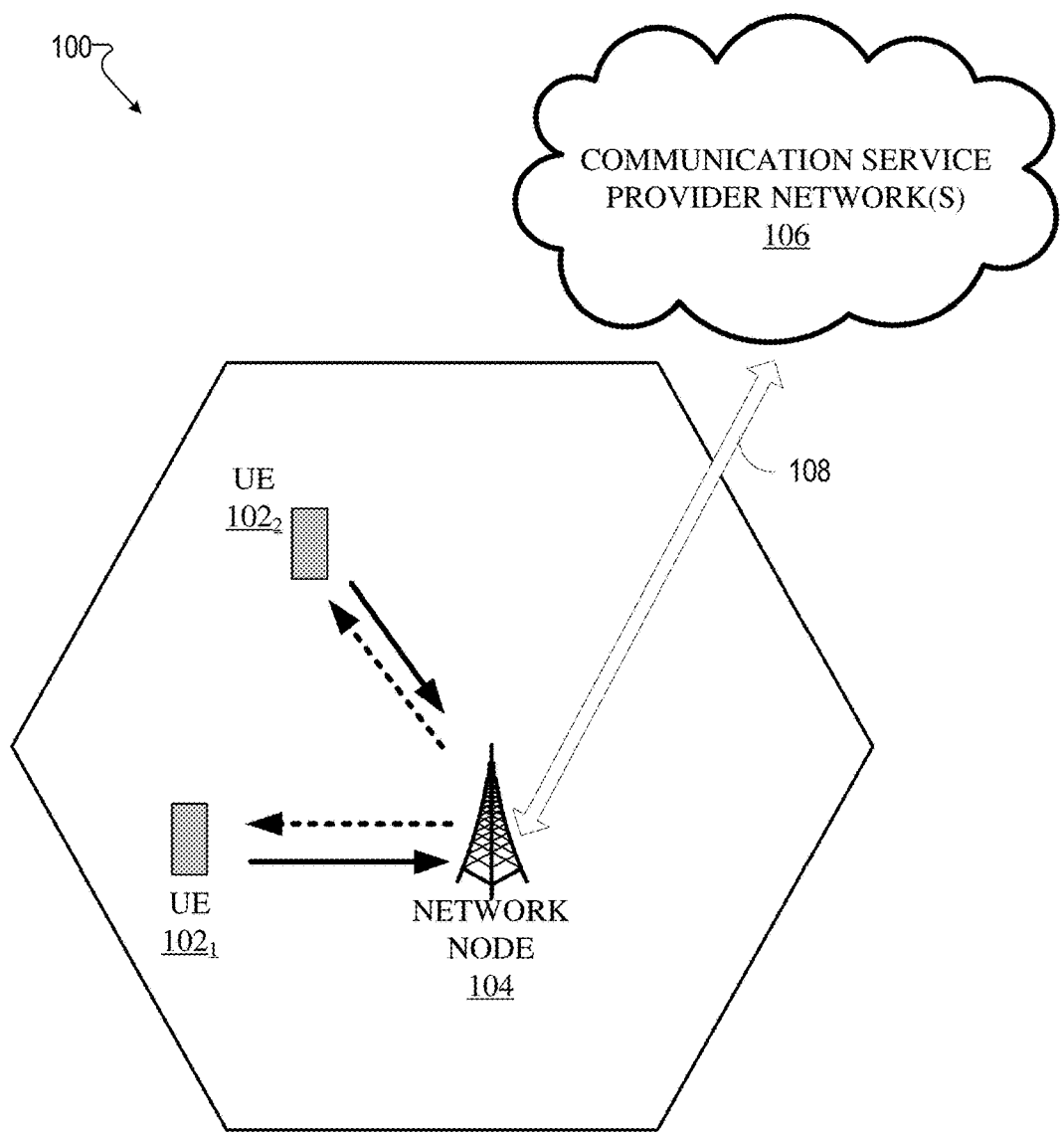
FIG. 1 illustrates an example wireless communication system in which a network node device (e.g., network node) and user equipment (UEs) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media.

As an overview, various embodiments are described herein to facilitate video session optimization for a 5G air interface or other next generation networks. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be desired to implement the methods. In addition, the methods could alternatively be represented as a series of interrelated states via a state diagram or events. Additionally, the methods described hereafter are capable of being stored on an article of manufacture (e.g., a machine-readable medium) to facilitate transporting and transferring such methodologies to computers. The term article of manufacture, as used herein, is intended to encompass a computer program accessible from any computer-readable device, carrier, or media, including a non-transitory machine-readable medium.

It should be noted that although various aspects and embodiments have been described herein in the context of 5G, or other next generation networks, the disclosed aspects are not limited to 5G, a universal mobile telecommunications system (UMTS) implementation, a long term evolution (LTE) implementation, and/or other network implementations, as the techniques can also be applied in 3G, or 4G systems. For example, aspects or features of the disclosed embodiments can be exploited in substantially any wireless communication technology. Such wireless communication technologies can include UMTS, global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), LTE, LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

As mentioned, described herein are systems, methods, articles of manufacture, and other embodiments or implementations that can facilitate video session optimization for a 5G network. Facilitating video session optimization for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of a UE are a target device, a device to device (D2D) UE, a machine type UE, a UE capable of machine to machine (M2M) communication, personal digital assistant (PDA), a Tablet or tablet computer, a mobile terminal, a smart phone, an IOT device, a laptop or laptop computer, a laptop having laptop embedded equipment (LEE, such as a mobile broadband adapter), laptop mounted equipment (LME), a universal serial bus (USB) dongle enabled for mobile communications, a computer having mobile capabilities, a mobile broadband adapter, a wearable device, a virtual reality (VR) device, a heads-up display (HUD) device, a smart vehicle (e.g., smart car), a machine-type communication (MTC) device, etc. A UE can have one or more antenna panels having vertical and horizontal elements. The embodiments are applicable to single carrier, multicarrier (MC), or carrier aggregation (CA) operation(s) of the UE. The term carrier aggregation (CA) is also referred to in connection with (e.g., interchangeably referenced as) a "multi-carrier system", a "multi-cell operation", a "multi-carrier operation", "multi-carrier" transmission and/or "multi-carrier" reception.

In some embodiments, the non-limiting term radio network node, or simply network node, is used. It can refer to any type of network node that serves a UE or network equipment connected to other network nodes, network elements, or any radio node from where a UE receives a signal. Non-exhaustive examples of radio network nodes are Node B, base station (BS), multi-standard radio (MSR) node such as MSR BS, eNode B, gNode B, network controller, radio network controller (RNC), base station controller (BSC), relay, donor node controlling relay, base transceiver station (BTS), edge nodes, edge servers, network access equipment, network access nodes, a connection point to a telecommunications network, such as an access point (AP), transmission points, transmission nodes, remote radio unit (RRU), remote radio head (RRH), nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

5G, also called new radio (NR) access, networks can support the following: data rates of several tens of megabits per second supported for tens of thousands of users; 1 gigabit per second offered simultaneously or concurrently to tens of workers on the same office floor; several hundreds of thousands of simultaneous or concurrent connections for massive sensor deployments; enhanced spectral efficiency compared to 4G or LTE; improved coverage compared to 4G or LTE; enhanced signaling efficiency compared to 4G or LTE; and reduced latency compared to 4G or LTE. In multicarrier systems, such as OFDM, each subcarrier can occupy bandwidth (e.g., subcarrier spacing). If carriers use the same bandwidth spacing, then the bandwidth spacing can be considered a single numerology. However, if the carriers occupy different bandwidth and/or spacing, then the bandwidth spacing can be considered a multiple numerology.

Cellular video traffic has seen growth in the past few years as increasingly smart mobile devices are released every few months, and cellular technologies such as LTE-A are getting deployed worldwide. However, to meet the demand, new technologies such as 5G, pre-5G LTE and RAN Intelligent Controller enabled networks (RIC) are being deployed. To avoid congestion and to effectively manage radio resources in the downlink of a 5G/RIC, a content aware scheduler design can exploit the unique features of H.264 scalable video coding (SVC). Content-aware networking refers to the methodology of exploiting the rate-distortion (RD) characteristics of the content and designing more adaptive and efficient network protocols. It advocates a cross-layer design philosophy, where network resources are allocated and provisioned under optimality criteria reflective of the content itself, thereby, providing an effective means of optimizing the video delivery under resource constraints.

One or more embodiments disclosed herein relate to avoiding congestion and effectively managing radio resources in a downlink of a 5G cellular network with a distributed unit (DU)/centralized unit (CU) split and controlled by a radio access network intelligent controller (RIC). A scheduler of the RIC can adaptively control video quality by optimally assigning physical resource blocks (PRBs) to the UEs based on the requested video type, device capability, and 5G NR radio frequency (RF) channel quality to maximize the number of 5G UE video sessions. Additionally, the radio resources can also be broken out and assigned based on the service level (e.g., conversational voice, conversational video (live streaming), non-conversational video (buffered streaming), real-time gaming, internet protocol multimedia subsystem (IMS) signaling, voice, video (live streaming), interactive gaming, video (buffered streaming), transmission control protocol (TCP) based, chat, file transfer protocol (FTP), peer-to-peer (p2p) file sharing, progressive video and others).The scheduler can be implemented for an orthogonal frequency division multiple access (OFDMA) 5G NR physical/media access control (PHY/MAC) layer as a second level scheduler on top of a transmission time interval (TTI) scheduler with an additional signaling mechanism. By taking advantage of the emerging RIC platform, the scheduler can be easily integrated into existing 5G systems, with very limited signaling overhead and without requiring additional equipment. The data flow and control flow can leverage an E2 interface defined in the RIC. Peak signal to noise ratio (PSNR) and video structural similarity index metrics (VSSIM) can be used to evaluate video quality and ensure that each UE receives at least a minimum video quality. Thus, the maximum video quality that can be assigned to each UE, by measuring 5G NR channel quality indicators (CQI), and signal to noise ratios (SNR), can be determined by formulating and scheduling optimization that maximizes the number of video sessions for the 5G UEs. The PRB scheduling problem is an integer linear problem (ILP), which can be reduced to a multiple-choice knapsack problem (MCKP). Therefore, a greedy heuristic and a water-filling heuristic can be used to solve the MCKP with reduced processing complexity at the gNodeB. Additionally, a fully polynomial-time approximation scheme (FPTAS) using dynamic programming and profit-scaling can be used to solve the MCKP.

The scalable video codec (SVC), an encoding standard, defines 21 profiles differing in capabilities and targeting different quality and applications for video streaming. An objective for SVC is to maximize the video quality experiences of the UEs in a particular cell. The term "level" with respect to video quality experience can be translated into a set of constraints of the decoder performance (e.g., video quality, maximum picture resolution, frame rate, and/or bit rate, or the like). A RIC based resource scheduler can exploit the unique features of an H.264 SVC. Thus, videos can be encoded into different H.264 profiles using a total video converter.

Content awareness implies that resources can be allocated based on the content, service type, and application quality of service (QoS) requirements. Thus, a downlink 5G NR scheduler for video streaming can be used to determine the number of PRBs for each UE based on the following: content characteristics, UE capabilities, link qualities, and/or available resources. Application program interfaces can obtain the aforementioned parameters. The goal is to maximize the video quality across all UEs.

Benefits of RIC-based video awareness scheduling comprise efficient utilization of resources, differentiation between users QoS requirements based on the content, service types, and device capabilities, increases in the capacity of the network, and decreases in network congestion. The scheduler hosted at the RIC can determine the profile level of each video and the number of PRBs allocated to the video based on the available number of PRBs, link quality between the UE and the gNodeB, and/or the UE's decoding capabilities.

Integer Linear Problem $$\text{maximize} \sum_{i=1}^{N} \sum_{l_{ij} \in L_i} x_{ij} Q_i(l_{ij}) \quad \text{Equation 1}$$

$$\text{subject to} \sum_{i=1}^{N} \sum_{l_{ij} \in L_i} x_{ij} \alpha_{ij} \leq M$$

$$\sum_{l_{ij} \in L_i} x_{ij} = 1, \forall i \quad \text{Equation 2}$$

Variables: $x_{ij} \in \{0, 1\}, \forall i, \forall l_{ij} \in L_i$ where, $l_{ij}$: User i is assigned profile level j;
where, $\alpha_{ij}$: Number of PRBs required for user i to smoothly receive video at level j;
where, Ri(Lij): Downlink rate required for user i when assigned level j;
where, $Q_i(l_{ij})$: Received video quality for user i when receives level j;
where, $x_{ij}$: Decision variable that is 1 if profile level $l_{ij}$ is assigned to user i, and 0 otherwise.

Equation 1 can maximize the video quality that is allocated to all the users. However, the constraints are that a higher bitrate and/or a higher number of physical resources than are available than what the radio conditions determine cannot be achieved. Thus, the variable $x_{ij}$ is used to determine the bitrate for the video that will be supported.

A greedy algorithm can be used to decrease the SVC level for each UE in a round robin fashion until a feasible solution is found.

Algorithm 1. Greedy heuristic for content aware PRB assignment.

1. For each UE i, sort the profile levels in increasing order of required PRBs, 2.
Pick the UEs in a round robin fashion.
3. For eacth UE i, choose the highest level $l_{ij}$, from the sorted sequence that does not exceed the remaining PRB budget out of M total.

Based on the request that the UEs are making, the UEs can be sorted and the PRBs can be allocated based on a round robin system until a feasible solution is found. However, it may not be the optimal solution. In this regard, a water filling heuristic can be used. While a water filling heuristic was originally used to optimally allocate the power to maximize the rate given some power constraints, the water filling heuristic can also assign better video quality to users that have better channels.

Algorithm 2. Water-Filling heuristic for content aware PRB assignment.

1. Sort the UEs in descending order of channel gains.
2. Pick the UEs fron this sorted sequence starting from the first.
3. Follow steps 1, 2, and 3 in the Greedy heuristic, i.e, for each UE i, assign the highest profile level $l_{ij}$, that does not exceed the remaining PRB budget.

Reduction to Multiple-Choice Knapsack Problem

The PRB scheduling problem formulated as an ILP can be cast as the Multiple-Choice Knapsack Problem (MCKP), which is a generalization of the classical 0-1 Knapsack Problem. In MCKP, we are given a set of items subdivided into N mutually disjoint classes, K1, . . . , KN, and a knapsack of total capacity c. Each item j∈ Ki has a profit pij and a weight wij. The goal is to choose exactly one item from each class so as to maximize the total profit without exceeding the capacity. The MCKP can be written as:

$$\text{maximize} \sum_{i=1}^{N} \sum_{j \in K_i} p_{ij} y_{ij} \quad \text{Equation 3}$$

$$\text{subject to} \sum_{i=1}^{N} \sum_{j \in K_i} w_{ij} y_{ij} \leq c$$

$$\sum_{j \in K_i} y_{ij} = 1, \forall i \quad \text{Equation 4}$$

Variables: $y_{ij} \in \{0, 1\}, \forall i, \forall j \in K_i$ where yij is the decision variable that takes the value 1 if item j is chosen from class Ki, and 0 otherwise. The number of classes in the MCKP corresponds to the number of UEs, and the knapsack capacity c corresponds to the number M of available PRBs. The items in each class are the videos encoded at different profile levels. The decision variable yij corresponds to the variable xij that decides whether or not to choose level hj for UE i. The weight wij corresponds to the number of PRBs aij assigned to UE i, and the profit pij is the video quality Qi(lij) experienced by UE i when receiving the video at level lij. We present an FPTAS for the MCKP to solve the PRB assignment problem. We first formulate a dynamic program. Let yi(q) denote the minimum weight of a solution to MCKP with total profit q, and classes K1, . . . , Ki. If no solution exists, we set yi(q)=c+1. We use an upper bound U to specify the termination point of this (finite horizon) dynamic program. We initialize y0(0)=0, and y0(q)=c+1, ∀q=1, . . . , U. Then, the recursion can be written as:

$$y_i(q) = \min \begin{cases} y_{i-1}(q - p_{i1}) + w_{i1}, & 0 \leq q - p_{i1} \\ y_{i-1}(q - p_{i2}) + w_{i2}, & 0 \leq q - p_{i2} \\ \vdots \\ y_{i-1}(q - p_{in_i}) + w_{in_i}, & 0 \leq q - p_{in_i} \end{cases}$$

This type of recurrence admits an FPTAS shown in

---
Algorithm 3 Dynamic Program Scaling of Profits
---
Compute an upper bound U.
Set $\mathscr{Y}_0(0) = 0$, and $\mathscr{Y}_0(q) = c + 1$, $\forall q = 1, \ldots, U$.
for $i = 1, \ldots, N$ do
  for $q = U, \ldots, 0$ do
    $\mathscr{Y}_i(q) = \min_{j \in K_j | q \geq \beta_{ij}} (\mathscr{Y}_{i-1}(q - \bar{p}_{ij}) + w_{ij})$.
$z_a^b = \max\{q | \mathscr{Y} N(q) \leq x\}$.
---

As set forth above, algorithm 3 selects the bitrate and schedules the PRBs such that the system can achieve results close to the optimal solution and maintain a high performance.

According to another embodiment, a method can comprise receiving, by network equipment comprising a processor from a server, performance data representative of a video performance rate applicable to a video available to be streamed to a user equipment as a video stream. In response to receiving the performance data and based on data associated with the user equipment, the method can comprise modifying, by the network equipment, the video performance rate for utilization by the user equipment, resulting in modified video performance data. The method can comprise receiving, by the network equipment from distributed unit equipment associated with base station equipment, channel quality indicator data representative of a channel quality of a channel between the base station equipment and the user equipment. The method can comprise receiving, by the network equipment from the distributed unit equipment, physical resource block data representative of a physical resource block to be utilized by the user equipment. In response to receiving the physical resource block data, the method can comprise modifying, by the network equipment, the physical resource block in accordance with the modified video performance data, resulting in a modified physical resource block usable to stream a modified video stream, wherein the modified video stream has been modified for the user equipment and is representative of the video to the user equipment.

According to another embodiment, a system can facilitate, receiving performance data representative of a video performance rate associated with a video available to be streamed to a user equipment. In response to receiving the performance data, the system can comprise modifying the video performance rate for utilization by the user equipment, resulting in modified video performance data. The system can comprise receiving channel quality indicator data representative of a quality of a channel between a base station and the user equipment. Additionally, the system can comprise receiving, from a distributed unit equipment associated with the base station, physical resource block data representative of a physical resource block to be utilized by the user equipment to stream the video as a video stream. Furthermore, in response to receiving the physical resource block data, the system can comprise modifying the physical resource block in accordance with the modified video performance data, resulting in a modified video stream to be utilized by the user equipment to stream the video.

According to yet another embodiment, described herein is a machine-readable medium that can perform the operations comprising receiving video performance rate data representative of a video performance rate associated with a video authorized to be sent to a user equipment as a video stream. In response to receiving the video performance data, the machine-readable medium can perform the operations comprising optimizing the video performance rate for utilization in connection with streaming of the video by the user equipment, resulting in an optimized video performance rate. The machine-readable medium that perform the operations comprising receiving reference signal received power data representative of a reference signal received power associated with signaling between base station equipment and the user equipment. Additionally, the machine-readable medium that perform the operations comprising receiving, from the base station equipment, physical resource block data representative of a physical resource block to be utilized by the user equipment for the streaming of the video. Furthermore, in response to receiving the physical resource block data, the machine-readable medium that perform the operations comprising optimizing the physical resource block in accordance with the optimized video performance rate, resulting in an optimized physical resource block to be used to stream an optimized version of the video stream to the user equipment.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102. The non-limiting term user equipment can refer to any type of device that can communicate with a network node in a cellular or mobile communication system.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can include a recommendation to transmit data via a closed loop multiple input multiple output (MIMO) mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD)/TDD, GSM/GSM EDGE Radio Access Network (GERAN), CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks fulfill the demand of exponentially increasing data traffic and allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may include: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications.

The 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are in use in 5G systems.

Figure 2:
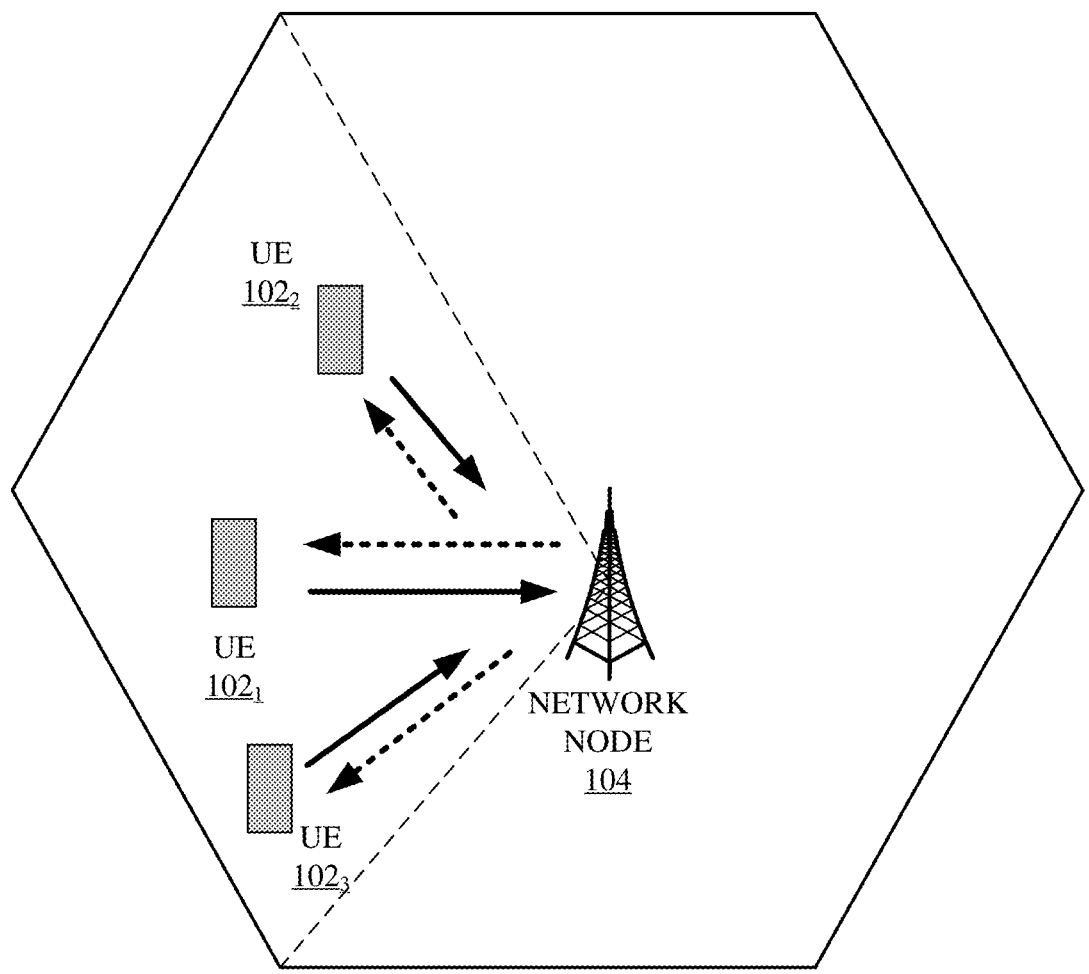
FIG. 2 illustrates an example schematic system block diagram of a downlink video scheduling system according to one or more embodiments.

Referring now to FIG. 2, illustrated is an example schematic system block diagram of a downlink video scheduling system according to one or more embodiments.

The RIC can allow radio resources to be efficiently used so that each UE can have the best video watching experience by ensuring that the capacity constraints on the RAN are being observed. For example, the radio resources may be scheduled between mobile devices $102_1$, $102_2$, $102_3$. Because video can consume a much higher percentage of radio resources, many UEs may not be able to obtain the required allocation of RAN resources to meet the demand for video by all UEs.

Figure 3:
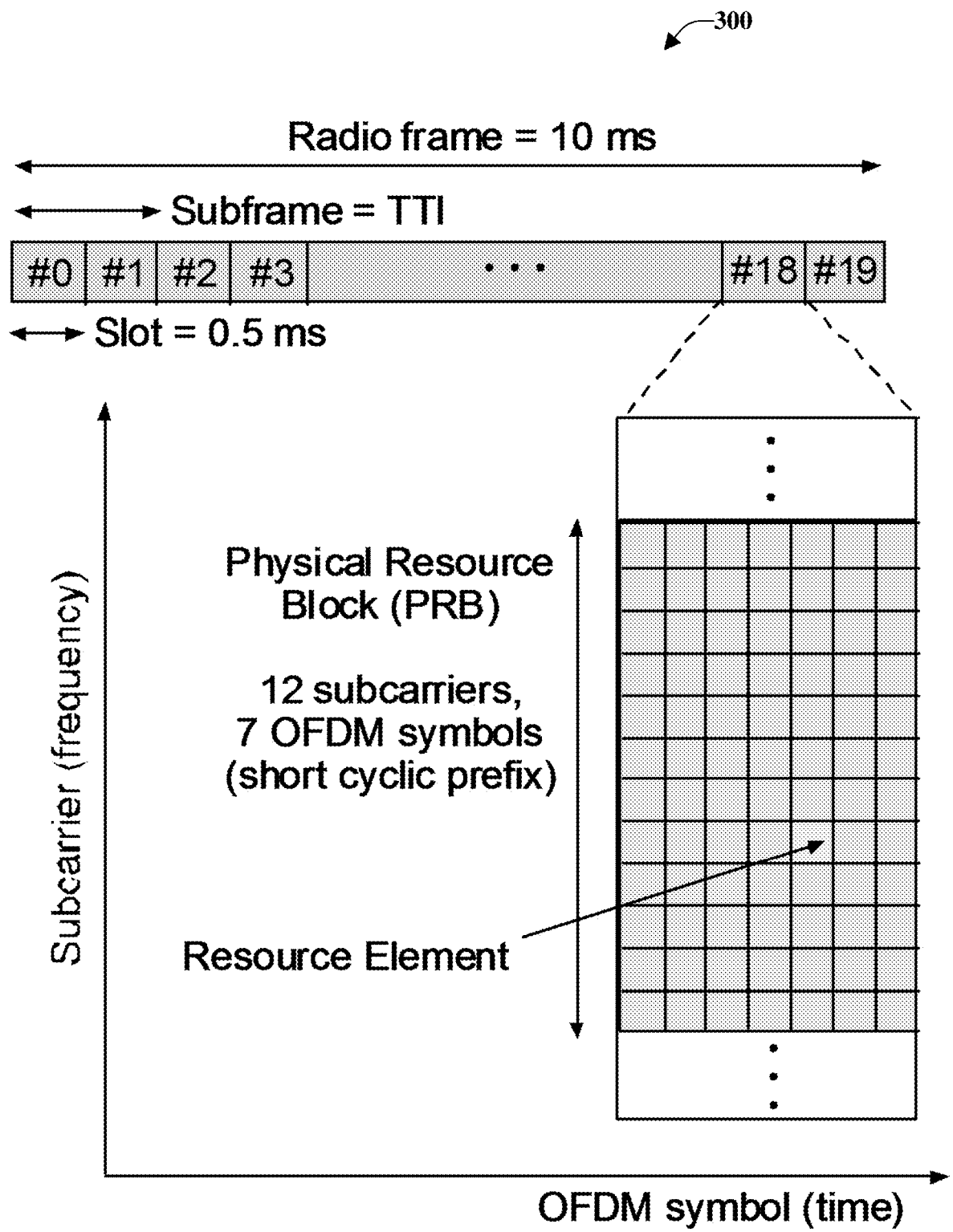
FIG. 3 illustrates an example schematic system block diagram of a downlink frame structure according to one or more embodiments.

Referring now to FIG. 3, illustrated is an example schematic system block diagram of a downlink frame structure 300 according to one or more embodiments.

The physical layer frame structure of a 5G NR downlink can be an OFDM system that comprises PRBs that can be allocated by a scheduler among the UEs $102_1, 102_2, 102_3$. A radio timeframe can be 10 ms, typically divided into 10 subframes, each with two time slots of 0.5 ms. Thus, the radio timeframe can have a 5 mHz slice effect spectrum that can be divided into the time domain into 20 subframes and each of the subframes can be 0.5 ms. Therefore, the 0.5 ms time domain and the 5 mHz frequency domain slice is a PRB that can be allocated among the UEs $102_1, 102_2, 102_3$. The PRB is the minimum unit of assignment to each UEs $102_1, 102_2, 102_3$, wherein a PRB typically comprises 12 subcarriers in frequency and 6 or 7 OFDM symbols in the time domain.

Figure 4:
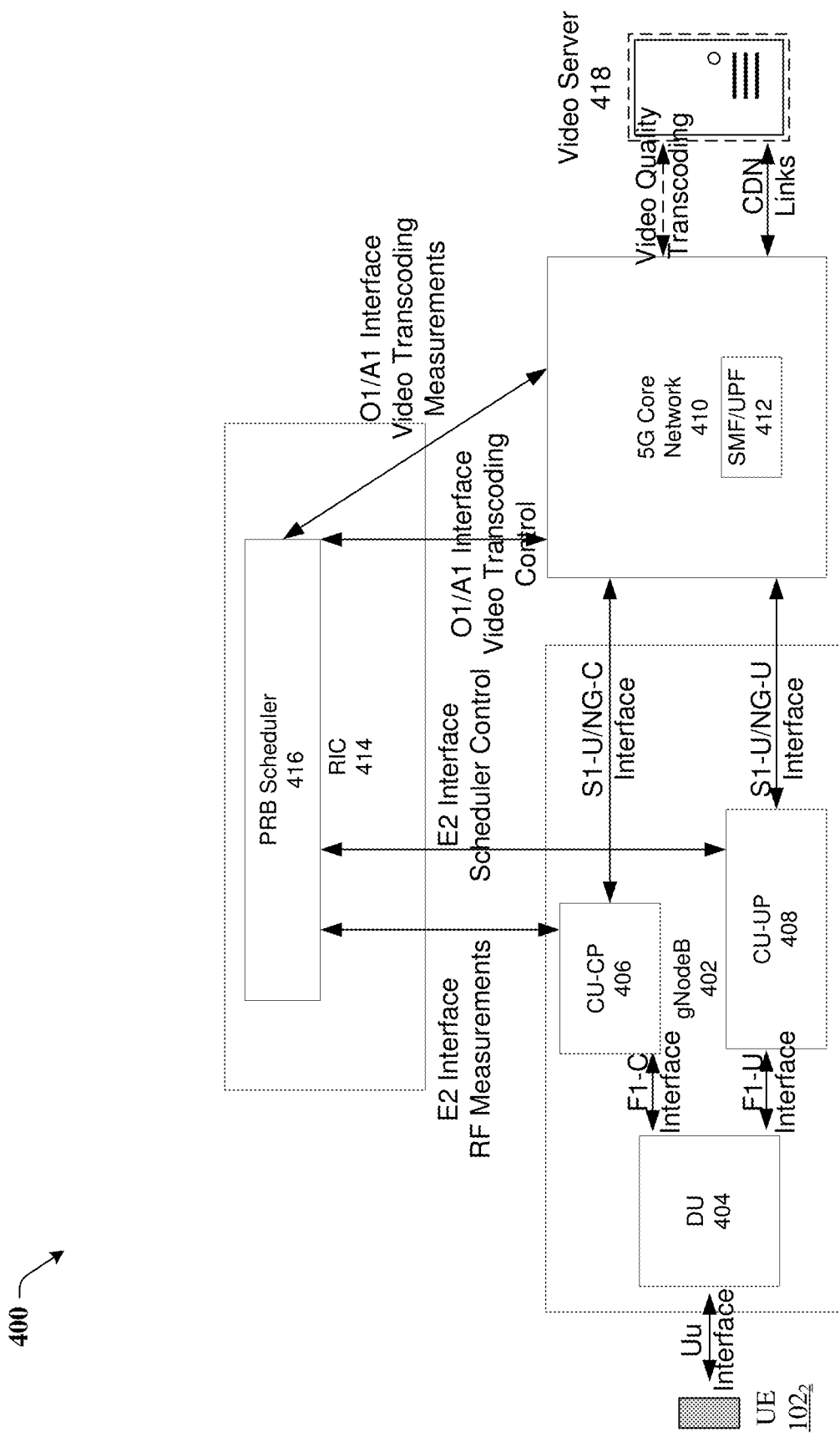
FIG. 4 illustrates an example schematic system block diagram of a scheduler architecture according to one or more embodiments.

Referring now to FIG. 4, illustrated is an example schematic system block diagram of a scheduler architecture 400 according to one or more embodiments.

When the UE 102 makes a video request, the UE 102 can connect with the gNodeB via the DU 404. The DU 404 then forwards this information to the centralized unit control plane (CU-CP) 406, which in turn forwards this information to the session management function (SMF)/user plane function (UPF) 412, where the request info is then sent to the video server 412. The video server 412 can then send video quality data to the PRB scheduler 416 via the 5G core network 410.

The PRB scheduler 416 can utilize bitrate information that has been estimated by the SMF 412. The SMF 412 can send the bitrate information, via an O1/A1 interface to the RIC 414 and PRB scheduler 416. At this point, the PRB scheduler 416 knows what bitrate the UE 102 is requesting. The PRB scheduler 416 can also utilize the radio channel conditions between the UE 102 and the DU 404. For instance, if the radio channel conditions are bad, then then RIC 414 may not be able to support a higher bitrate. The DU 404 can measure the radio channel conditions and then send this information to the PRB scheduler 416 via the CU-CP 406 over an E2 interface API. The optimization from the PRB scheduler 416 can determine the number of radio resources that are to be allocated to each UE 102. The PRB scheduler 416 can determine the optimal bitrate that the UE 102 can support and then send that determination back to the SMF 412 so that the SMF 412 can send this information to the video server 418 for the video server to modify its video settings (e.g., resolution, quality, bitrate, frames per second). Consequently, the video server 418 can provide video resources that are constrained by the aforementioned processes through the CU-CP 406, to the DU 404, and then to the UE 102.

The RIC 414 can interface with the CU-CP 406 and the CU-UP 408 to perform the scheduling. Once the scheduling resources have been allocated, a video bearer gets constructed and then the video streaming server can begin to send video streaming down to the core network and into the RIC 414, gNodeB 402, and then to the UE 102. The 5G core network 410 can comprise an SMF/UPF where all traffic passes through before going to the RIC 414 and on to the UE 102. After the video bearer is created, the PRB scheduler 416 can begin to allocate radio resources in the PRB scheduler 416 that is running in the DU 404. The video can then come from the video server 418, through the 5G core network 410, through the gNodeB 402, and then gets sent over the Uu interface (the cellular link) to the UE 102. The PRB s are allocated to support the bitrate for the videos.

Figure 5:
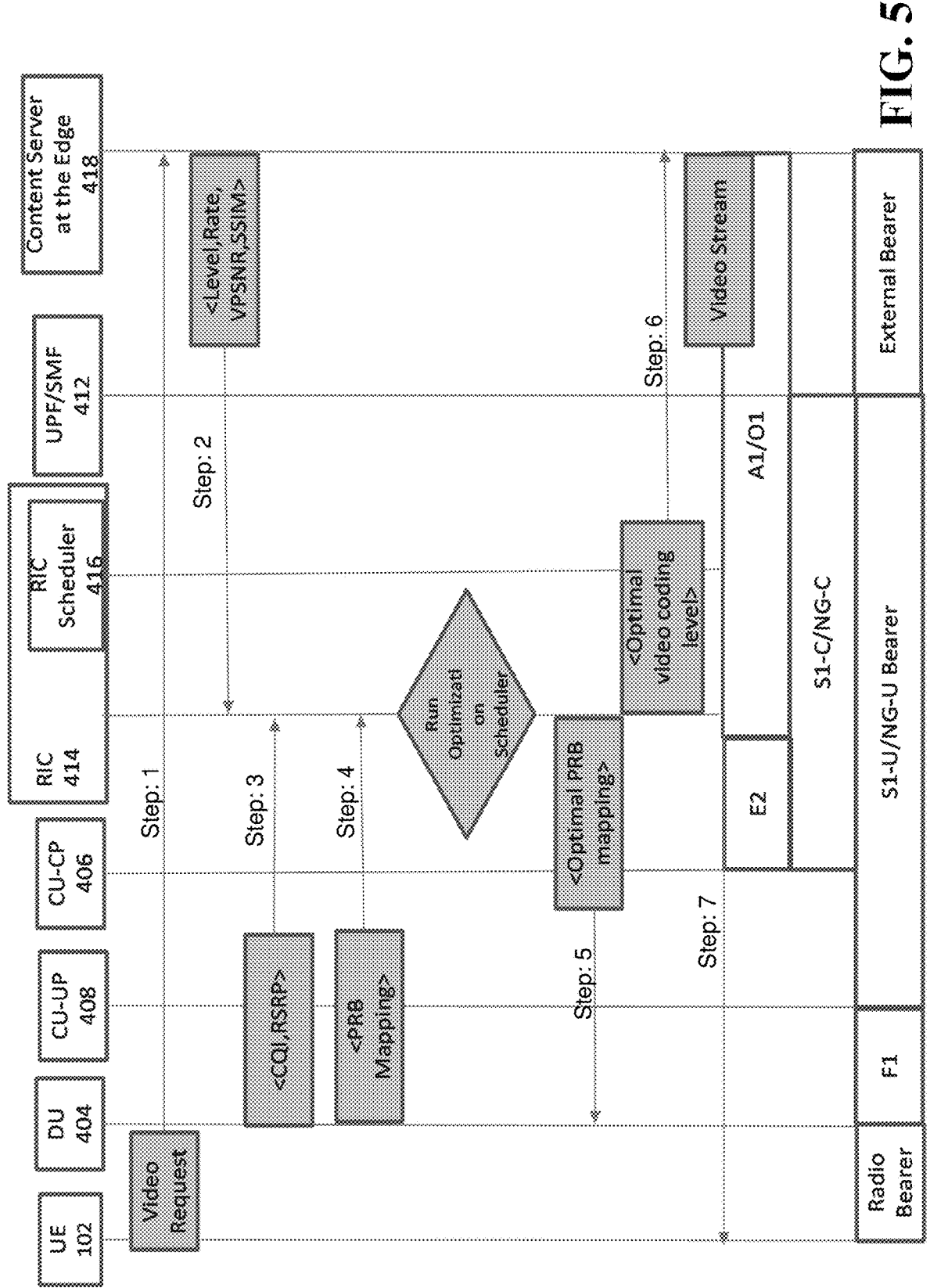
FIG. 5 illustrates an example schematic system block diagram of a radio access intelligent controller-based video aware physical resource block according to one or more embodiments.

Referring now to FIG. 5, illustrated is an example schematic system block diagram of a radio access intelligent controller-based video aware physical resource block according to one or more embodiments.

The UE 102 can send a video request to the content server 418 at step 1. The video server 418 can then send the parameters of the video (e.g., level, rate, visual peak signal-to-noise ratio (VPSNR), structural similarity index (SSIM), and/or any other video quality metrics) to the RIC 414 at step 2. If the level of the video is increased, it will yield a higher score for VPSNR, and SSIM. The CQI and reference signal received power (RSRP) are the radio link quality parameters that are measured by the DU 404 and then sent via the CU-CUP 406 to the RIC 414 and the RIC scheduler 416 at step 3. At step 4, the DU 404 can also send current PRB mapping data to the RIC 414 and the RIC scheduler 416. The RIC 414 can then run the optimization solutions (e.g., algorithms, processes and heuristics) as reference above. When the RIC scheduler 416 executes the optimization procedure, the RIC scheduler 416 can yield a mapping of PRBs to UEs 102 and the optimal video coding level. The mapping of PRBs to UEs 102 can then be sent back to the DU 404 at step 5 for the DU 404 to send this information to the UEs 102. The video coding level can be sent to the content server at step 6, and the video stream can begin with those settings at step 7. It is noted that the representation of the steps are based on one destination point on the graph and is not necessarily dispositive of the overall communication path. For instance, the video request path flow, from the UE 102 at step 1, ends at the content server 418. However, the request is first received by the DU 404. The request can then transition from the DU 404 to the CU-UP 408, to the UPF/SMF 412 prior to being received by the content server 418, without necessarily being routed via the RIC 414.

Figure 6:
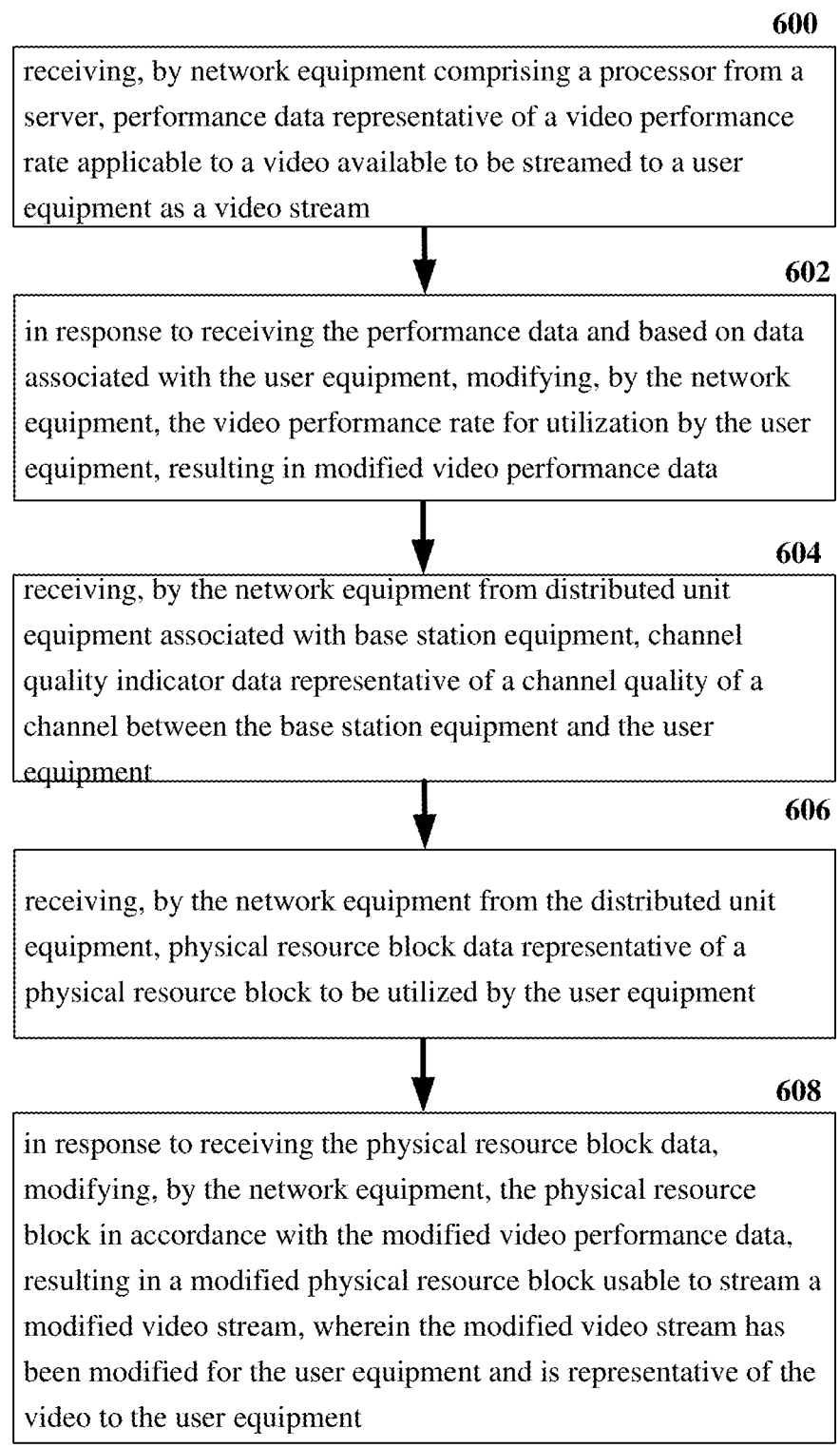
FIG. 6 illustrates an example flow diagram for a method for facilitating video session optimization according to one or more embodiments.

Referring now to FIG. 6, illustrated is an example flow diagram for a method for facilitating video session optimization according to one or more embodiments.

At element 600, a method can comprise receiving, by network equipment comprising a processor from a server, performance data representative of a video performance rate applicable to a video available to be streamed to a user equipment as a video stream. In response to receiving the performance data and based on data associated with the user equipment, at element 602, the method can comprise modifying, by the network equipment, the video performance rate for utilization by the user equipment, resulting in modified video performance data. At element 604, the method can comprise receiving, by the network equipment from distributed unit equipment associated with base station equipment, channel quality indicator data representative of a channel quality of a channel between the base station equipment and the user equipment. At element 606, the method can comprise receiving, by the network equipment from the distributed unit equipment, physical resource block data representative of a physical resource block to be utilized by the user equipment. In response to receiving the physical resource block data, at element 608, the method can comprise modifying, by the network equipment, the physical resource block in accordance with the modified video performance data, resulting in a modified physical resource block usable to stream a modified video stream, wherein the modified video stream has been modified for the user equipment and is representative of the video to the user equipment.

Figure 7:
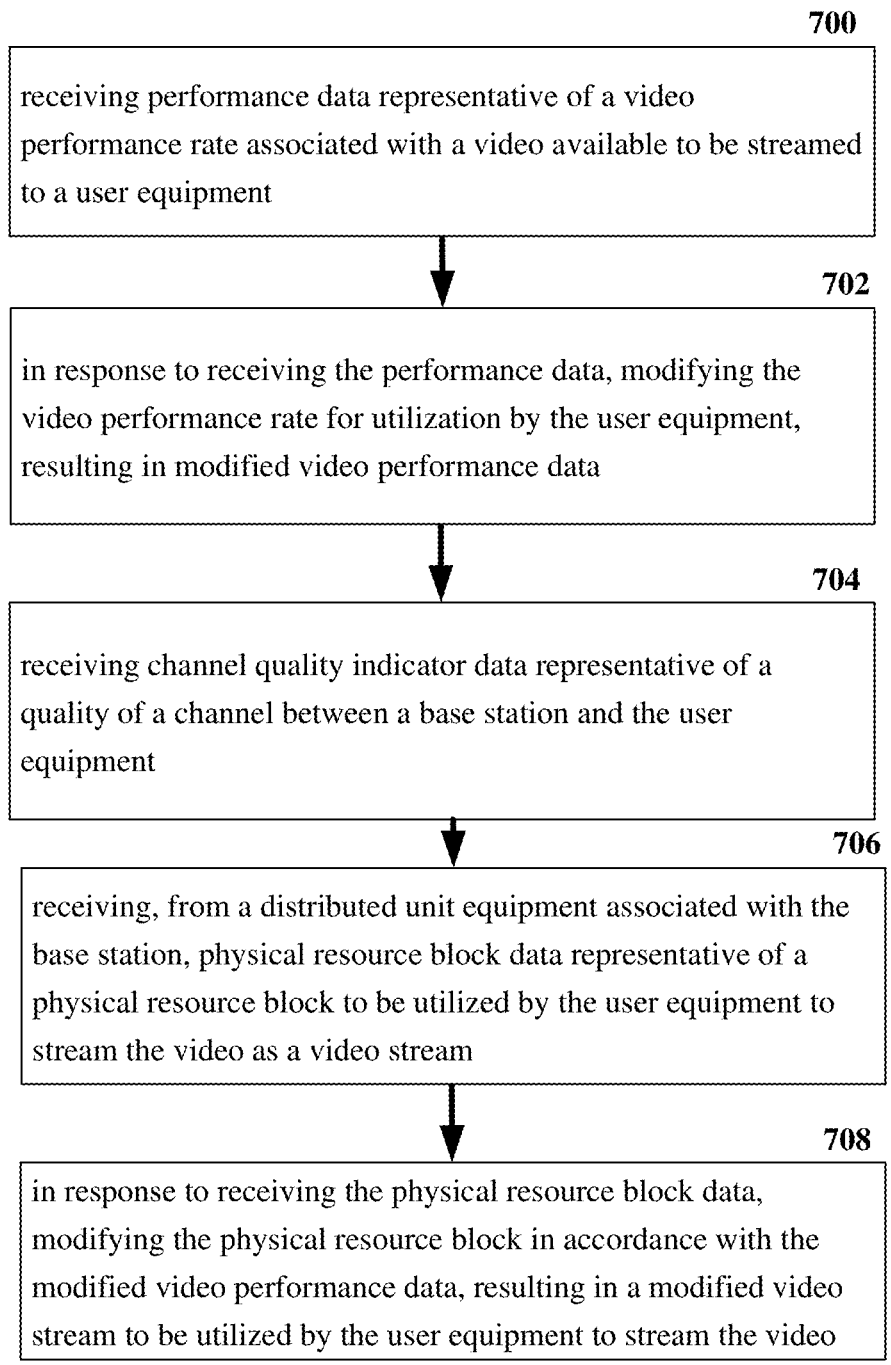
FIG. 7 illustrates an example flow diagram for a system for facilitating video session optimization according to one or more embodiments.

Referring now to FIG. 7, illustrated is an example flow diagram for a system for facilitating video session optimization according to one or more embodiments.

At element 700, a system can facilitate receiving performance data representative of a video performance rate associated with a video available to be streamed to a user equipment. In response to receiving the performance data, at element 702, the system can comprise modifying the video performance rate for utilization by the user equipment, resulting in modified video performance data. The system can comprise receiving channel quality indicator data representative of a quality of a channel between a base station and the user equipment at element 704. Additionally, at element 706, the system can comprise receiving, from a distributed unit equipment associated with the base station, physical resource block data representative of a physical resource block to be utilized by the user equipment to stream the video as a video stream. Furthermore, in response to receiving the physical resource block data, at element 708, the system can comprise modifying the physical resource block in accordance with the modified video performance data, resulting in a modified video stream to be utilized by the user equipment to stream the video.

Figure 8:
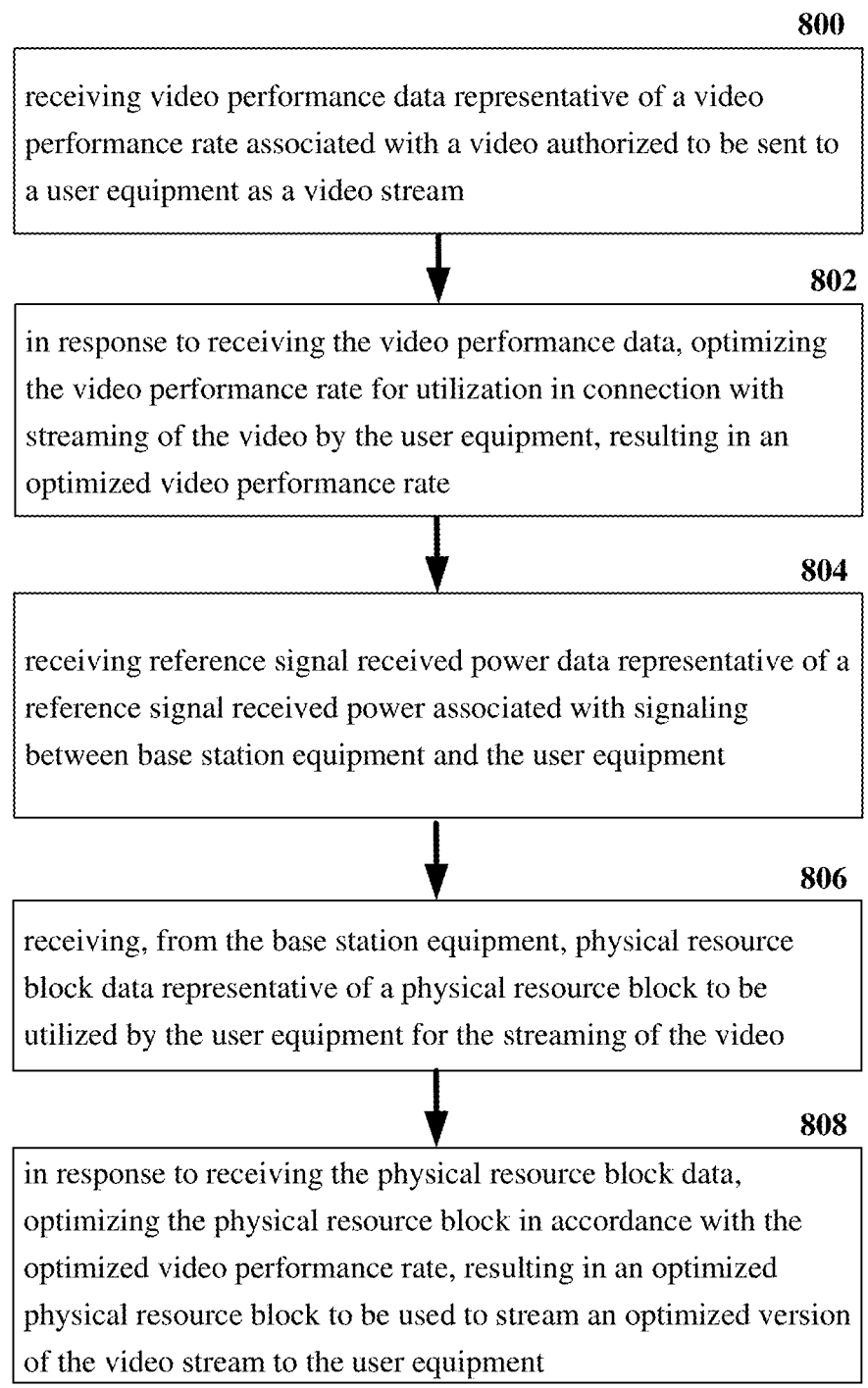
FIG. 8 illustrates an example flow diagram for a machine-readable medium facilitating video session optimization according to one or more embodiments.

Referring now to FIG. 8, illustrated is an example flow diagram for a machine-readable medium facilitating video session optimization according to one or more embodiments.

As illustrated, a non-transitory machine-readable medium can comprise executable instructions that, when executed by a processor, facilitate performance of operations. The operations comprise, at element 800, receiving video performance data representative of a video performance rate associated with a video authorized to be sent to a user equipment as a video stream. In response to receiving the video performance data, the operations comprise at element 802, optimizing the video performance rate for utilization in connection with streaming of the video by the user equipment, resulting in an optimized video performance rate. At element 804, the operations comprise receiving reference signal received power data representative of a reference signal received power associated with signaling between base station equipment and the user equipment. Additionally, at element 806, the operations comprise receiving, from the base station equipment, physical resource block data representative of a physical resource block to be utilized by the user equipment for the streaming of the video. Furthermore, in response to receiving the physical resource block data, at element 808, the operations comprise optimizing the physical resource block in accordance with the optimized video performance rate, resulting in an optimized physical resource block to be used to stream an optimized version of the video stream to the user equipment.

Figure 9:
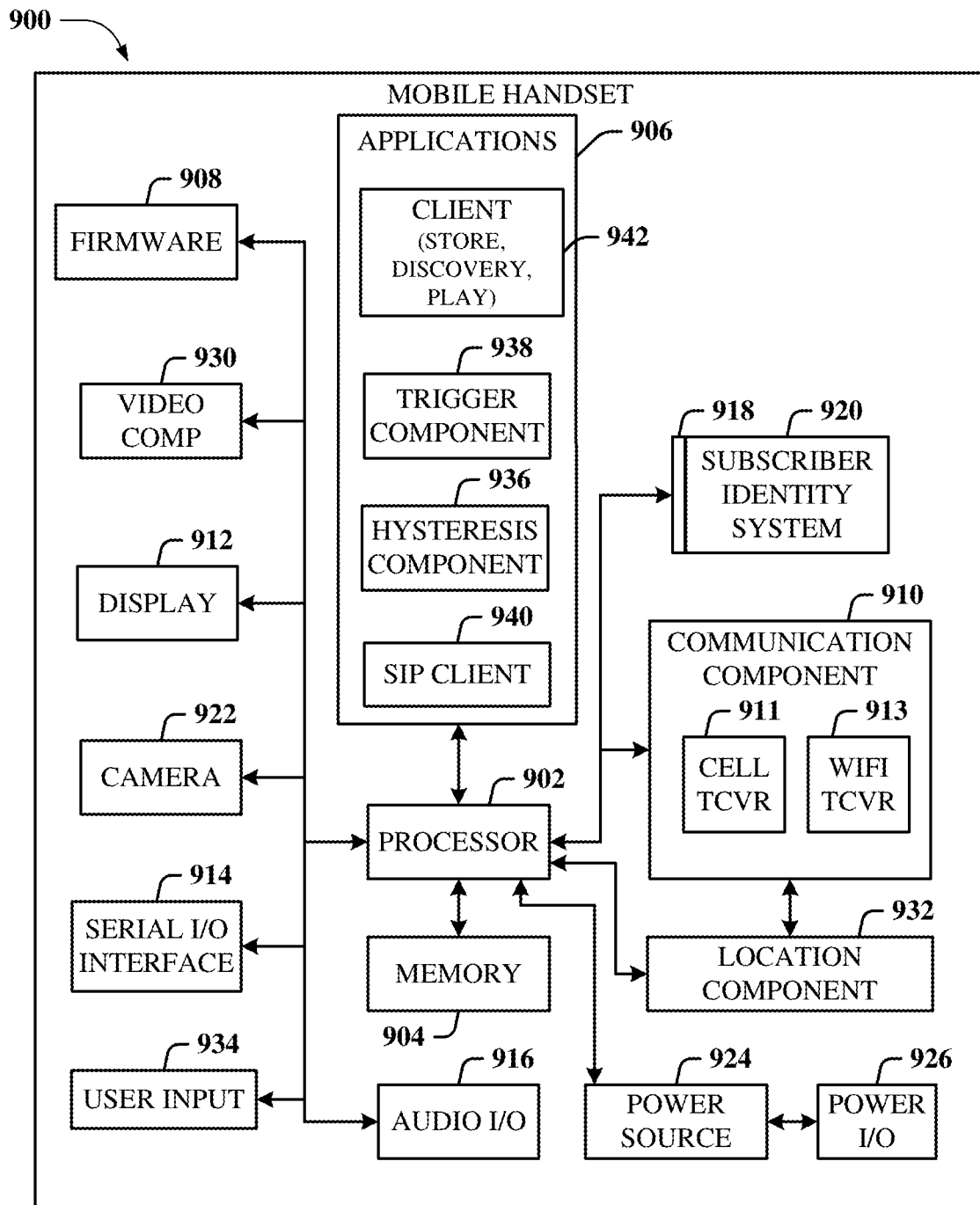
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device, such as a mobile handset 900, capable of connecting to a network in accordance with some embodiments described herein. Although a mobile handset 900 is illustrated herein, it will be understood that other mobile devices are contemplated herein and that the mobile handset 900 is merely illustrated to provide context for the embodiments of the various embodiments described herein. The following discussion is intended to provide a brief, general description of an example of a suitable environment, such as mobile handset 900, in which the various embodiments can be implemented. While the description includes a general context of computer-executable instructions embodied on a machine-readable medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer-readable media.

The mobile handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, voice over internet protocol (VoIP) networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The mobile handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an alternating current (AC) power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The mobile handset 900, as indicated above related to the communications component 910, includes an indoor network radio transceiver 913 (e.g., Wi-Fi transceiver). This function supports the indoor radio link, such as IEEE 802.11, for the mobile handset 900, e.g., a dual-mode GSM handset. The mobile handset 900 can accommodate at least satellite radio services through a handset that can combine wireless voice and digital radio chipsets into a single handheld device.

Figure 10:
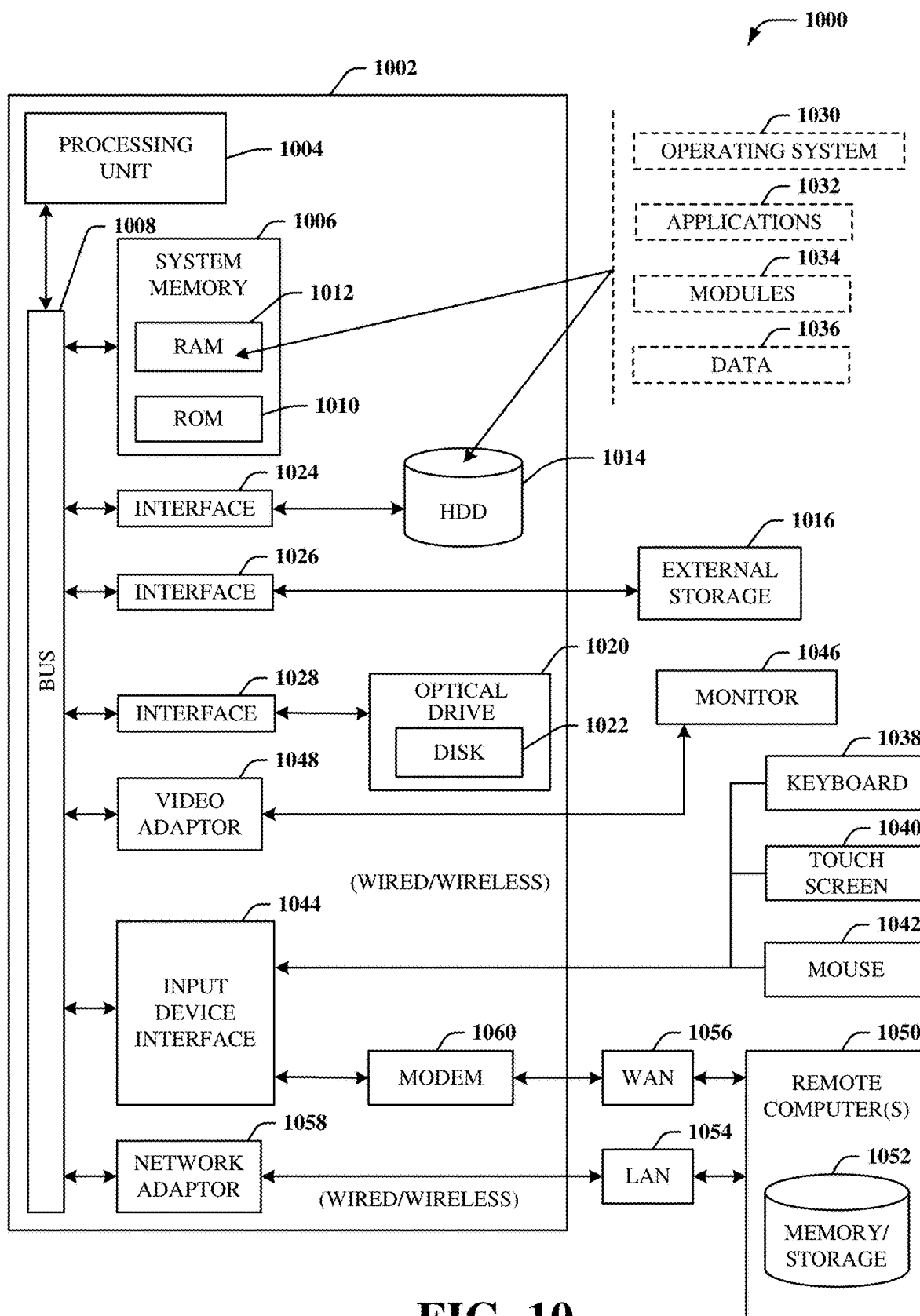
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable media, machine-readable media, and/or communications media, which two terms are used herein differently from one another as follows. Computer-readable media or machine-readable media can be any available media that can be accessed by the computer and includes both volatile and nonvolatile media, removable and non-removable media. By way of example, and not limitation, computer-readable media or machine-readable media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of USB and IEEE 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, an RF remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wi-Fi and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by network equipment comprising a processor from a server, performance data representative of a video performance rate applicable to a video available to be streamed to a user equipment as a video stream;
   in response to receiving the performance data and based on data associated with the user equipment, modifying, by the network equipment, the video performance rate for utilization by the user equipment, resulting in modified video performance data;
   receiving, by the network equipment from distributed unit equipment associated with base station equipment, channel quality indicator data representative of a channel quality of a channel between the base station equipment and the user equipment;

receiving, by the network equipment from the distributed unit equipment, physical resource block data representative of a physical resource block to be utilized by the user equipment; and in response to receiving the physical resource block data, modifying, by the network equipment, the physical resource block in accordance with the modified video performance data, resulting in a modified physical resource block usable to stream a modified video stream, wherein the modified video stream has been modified for the user equipment and is representative of the video to the user equipment, wherein the modifying of the physical resource block in accordance with the modified video performance data comprises modifying the physical resource block based on a fully polynomial time approximation that assigns a group of available physical resource blocks comprising the physical resource block to a group of user equipment comprising the user equipment.

2. The method of claim 1, further comprising:

in response to modifying the physical resource block, sending, by the network equipment to the base station equipment, the modified video stream to be sent to the user equipment.

3. The method of claim 2, wherein the performance data comprises video peak signal to noise ratio data representative of a peak signal to noise ratio applicable to the video stream.

4. The method of claim 1, wherein the performance data comprises structural similarity index measure data representative of a structural similarity index measure applicable to the video stream.

5. The method of claim 1, wherein the performance data comprises video rate data representative of a video rate to be applied to streaming of the video stream.

6. The method of claim 1, further comprising:

in response to receiving the physical resource block data, allocating, by the network equipment, the physical resource block to the video to be streamed to the user equipment as the video stream.

7. The method of claim 1, wherein the channel quality indicator comprises a link quality measurement associated with the channel between the base station equipment and the user equipment.

8. A system, comprising:

a processor; and a memory that stores executable instructions that, when executed by the processor, facilitate performance of operations, comprising:

receiving performance data representative of a video performance rate associated with a video available to be streamed to a user equipment;

in response to receiving the performance data, modifying the video performance rate for utilization by the user equipment, resulting in modified video performance data;

receiving channel quality indicator data representative of a quality of a channel between a base station and the user equipment;

receiving, from a distributed unit equipment associated with the base station, physical resource block data representative of a physical resource block to be utilized by the user equipment to stream the video as a video stream; and in response to receiving the physical resource block data, modifying the physical resource block in accordance with the modified video performance data, resulting in a modified video stream to be utilized by the user equipment to stream the video, wherein the modifying of the physical resource block in accordance with the modified video performance data comprises modifying the physical resource block based on a fully polynomial time approximation process that assigns a group of available physical resource blocks comprising the physical resource block to a group of user equipment comprising the user equipment.

9. The system of claim 8, wherein the operations further comprise:

receiving decoding capability data representative of a video decoding capability of the user equipment.

10. The system of claim 9, wherein the video decoding capability comprises a video quality capability of the user equipment applicable to the video.

11. The system of claim 9, wherein the video decoding capability comprises a picture resolution quality of the user equipment applicable to the video.

12. The system of claim 9, wherein the video decoding capability comprises a frame rate of the user equipment applicable to the video stream of the video.

13. The system of claim 9, wherein the video decoding capability comprises a bit rate of the user equipment applicable to the video stream of the video.

14. The system of claim 9, wherein the performance data comprises video rate data representative of a video rate to be applied to streaming of the video stream.

15. A non-transitory machine-readable medium, comprising executable instructions that, when executed by a processor, facilitate performance of operations, comprising:

receiving video performance data representative of a video performance rate associated with a video authorized to be sent to a user equipment as a video stream;

in response to receiving the video performance data, optimizing the video performance rate for utilization in connection with streaming of the video by the user equipment, resulting in an optimized video performance rate;

receiving reference signal received power data representative of a reference signal received power associated with signaling between base station equipment and the user equipment;

receiving, from the base station equipment, physical resource block data representative of a physical resource block to be utilized by the user equipment for the streaming of the video; and in response to receiving the physical resource block data, optimizing the physical resource block in accordance with the optimized video performance rate, resulting in an optimized physical resource block to be used to stream an optimized version of the video stream to the user equipment, wherein the optimizing of the physical resource block in accordance with the optimizing video performance data comprises optimizing the physical resource block based on a fully polynomial time approximation scheme that assigns a group of available physical resource blocks comprising the physical resource block to a group of user equipment comprising the user equipment.

16. The non-transitory machine-readable medium of claim 15, wherein receiving the video performance data is in response to a request for the video from the user equipment.

17. The non-transitory machine-readable medium of claim 15, wherein optimizing the physical resource block comprises mapping the video performance data to the physical resource block data to improve a quality associated with the optimized version of the video stream.

18. The non-transitory machine-readable medium of claim 15, wherein the operations further comprise:
   in response to optimizing the physical resource block, transmitting the optimized version of the video stream to the user equipment.

19. The non-transitory machine-readable medium of claim 15, wherein the video performance data comprises peak signal to noise ratio data representative of a peak signal to noise ratio associated with the signaling between the base station equipment and the user equipment.

20. The non-transitory machine-readable medium of claim 15, wherein the video performance data comprises structural similarity index measure data representative of a structural similarity index measure associated with the streaming of the video to the user equipment.

* * * * *